US009376766B2

(12) United States Patent
Hobbs et al.

(10) Patent No.: US 9,376,766 B2
(45) Date of Patent: Jun. 28, 2016

(54) LOW WEIGHT-HARDBACK CARPET TILE

(75) Inventors: James Hobbs, LaGrange, GA (US); Joel Sheppard, LaGrange, GA (US); Stuart Jones, LaGrange, GA (US); James Woods, Jr., LaGrange, GA (US); John P. Bradford, LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 1321 days.

(21) Appl. No.: 12/552,862

(22) Filed: Sep. 2, 2009

(65) Prior Publication Data

US 2010/0170991 A1 Jul. 8, 2010

Related U.S. Application Data

(60) Provisional application No. 61/093,640, filed on Sep. 2, 2008, provisional application No. 61/163,907, filed on Mar. 27, 2009.

(51) Int. Cl.
*D05C 17/02* (2006.01)
*D06N 7/00* (2006.01)
(Continued)

(52) U.S. Cl.
CPC .............. *D05C 17/02* (2013.01); *B60N 3/048* (2013.01); *D04H 11/00* (2013.01); *D06N 7/0071* (2013.01); *B29L 2031/3017* (2013.01); *B29L 2031/7322* (2013.01); *Y10T 428/23921* (2015.04); *Y10T 428/23979* (2015.04); *Y10T 428/23986* (2015.04)

(58) Field of Classification Search
CPC ............ B32B 2419/04; B32B 2471/00; B32B 2471/02; B32B 2605/18; B32B 2307/306; B32B 2307/3065; D06N 7/0063; D06N 7/0065; D06N 7/0071; D06N 7/0073; D06N 7/0078; D10B 2503/04; D10B 2503/041; D05C 17/02; D05C 17/026; B29L 2031/732; B29L 2031/7322; B29L 2031/7652; E04F 15/02
USPC ..................................... 428/95, 97, 920, 921
See application file for complete search history.

(56) References Cited

U.S. PATENT DOCUMENTS

| 2,042,692 A | 7/1936 | Wurzburg |
| 2,396,039 A | 3/1946 | Burton et al. |

(Continued)

FOREIGN PATENT DOCUMENTS

| CN | 1744988 | 3/2006 |
| CN | 201139396 | 10/2008 |

(Continued)

OTHER PUBLICATIONS

INTUMAX, Revolutionary Flame Retardant Coating, printout from http://www.broadview-tech.com/Products/Intumaxz.aspx, Aug. 26, 2012.*

(Continued)

*Primary Examiner* — Cheryl Juska
(74) *Attorney, Agent, or Firm* — Kilpatrick Townsend & Stockton LLP

(57) ABSTRACT

Low weight and non-square carpet tile suitable for use in mass transit vehicles, particularly passenger aircraft. The carpet tile preferably weighs less than about 82 ounces per square yard. The carpet tile of this invention may have a carpet pile and at least one backing layer. The backing layer may use a low weight filler material. The carpet tiles satisfy transportation industry standards for flame, smoke and toxicity.

36 Claims, 6 Drawing Sheets

(51) Int. Cl.
  *B60N 3/04*   (2006.01)
  *D04H 11/00*   (2006.01)
  *B29L 31/30*   (2006.01)
  *B29L 31/00*   (2006.01)

(56) References Cited

U.S. PATENT DOCUMENTS

| | | | | |
|---|---|---|---|---|
| 3,760,046 | A * | 9/1973 | Schwartz et al. | 264/46.1 |
| 3,819,462 | A * | 6/1974 | Starr et al. | 428/93 |
| 3,825,464 | A * | 7/1974 | Crowley | 428/96 |
| 3,875,716 | A | 4/1975 | Eusemann | |
| 4,010,301 | A | 3/1977 | Anderson et al. | |
| 4,010,302 | A | 3/1977 | Anderson et al. | |
| 4,082,874 | A | 4/1978 | Traylor | |
| 4,089,140 | A | 5/1978 | McIntyre et al. | |
| 4,140,071 | A * | 2/1979 | Gee et al. | 112/475.23 |
| 4,242,389 | A | 12/1980 | Howell | |
| 4,269,881 | A | 5/1981 | Johnson et al. | |
| 4,273,890 | A * | 6/1981 | Hirzy | 525/129 |
| 4,303,732 | A | 12/1981 | Torobin | |
| 4,434,251 | A * | 2/1984 | Sasajima et al. | 521/50.5 |
| 4,439,476 | A * | 3/1984 | Guild | 428/96 |
| 4,689,256 | A * | 8/1987 | Slosberg et al. | 428/95 |
| 4,737,764 | A | 4/1988 | Harrison | |
| 4,872,930 | A | 10/1989 | Kajikawa et al. | |
| 4,931,129 | A | 6/1990 | Bartlett et al. | |
| 5,030,496 | A * | 7/1991 | McGurran | 428/85 |
| 5,160,775 | A * | 11/1992 | Yamada | 428/95 |
| 5,198,277 | A | 3/1993 | Hamilton et al. | |
| 5,204,155 | A | 4/1993 | Bell et al. | |
| RE34,951 | E | 5/1995 | Slosberg et al. | |
| 5,534,348 | A | 7/1996 | Miller et al. | |
| 5,560,972 | A | 10/1996 | Blakely et al. | |
| 5,902,663 | A * | 5/1999 | Justesen et al. | 428/95 |
| 5,962,349 | A * | 10/1999 | Mizukami et al. | 442/311 |
| 6,203,879 | B1 | 3/2001 | Desai | |
| 6,291,048 | B1 | 9/2001 | Jerdee et al. | |
| 6,307,207 | B1 | 10/2001 | Burbank | |
| 6,838,147 | B2 * | 1/2005 | Burns et al. | 428/95 |
| 6,908,656 | B2 | 6/2005 | Daniel et al. | |
| 7,018,492 | B1 | 3/2006 | Mumm et al. | |
| 7,083,841 | B2 | 8/2006 | Oakey et al. | |
| 7,297,385 | B2 | 11/2007 | Daniel et al. | |
| 7,374,808 | B2 * | 5/2008 | Sellman, Jr. | D04H 11/00 156/250 |
| 7,423,069 | B2 * | 9/2008 | Buszard et al. | 521/106 |
| 7,993,717 | B2 | 8/2011 | O'Connor | |
| 8,083,875 | B2 * | 12/2011 | Sheppard | B60N 3/042 156/324.4 |
| 8,613,406 | B2 | 12/2013 | Jones et al. | |
| 8,739,381 | B2 * | 6/2014 | Jones | B60N 3/042 156/64 |
| 2001/0030011 | A1 | 10/2001 | Nasli-Bakir et al. | |
| 2002/0034606 | A1 | 3/2002 | Miller et al. | |
| 2002/0046433 | A1 * | 4/2002 | Sellman et al. | 8/488 |
| 2002/0119281 | A1 * | 8/2002 | Higgins et al. | 428/95 |
| 2002/0132085 | A1 * | 9/2002 | Higgins et al. | 428/95 |
| 2002/0142126 | A1 * | 10/2002 | Higgins et al. | 428/95 |
| 2002/0160144 | A1 * | 10/2002 | Higgins et al. | 428/95 |
| 2003/0116379 | A1 | 6/2003 | Khambete et al. | |
| 2003/0175474 | A1 * | 9/2003 | Higgins | B32B 5/06 428/95 |
| 2003/0175475 | A1 * | 9/2003 | Higgins | B32B 5/06 428/95 |
| 2003/0203152 | A1 | 10/2003 | Higgins et al. | |
| 2003/0232171 | A1 * | 12/2003 | Keith et al. | 428/95 |
| 2004/0022985 | A1 | 2/2004 | Higgins et al. | |
| 2004/0030011 | A1 * | 2/2004 | Buszard et al. | 524/127 |
| 2004/0030733 | A1 | 2/2004 | Bell | |
| 2004/0062899 | A1 | 4/2004 | Kobayashi et al. | |
| 2004/0086683 | A1 * | 5/2004 | Higgins et al. | 428/95 |
| 2004/0091664 | A1 * | 5/2004 | Gardner et al. | 428/85 |
| 2004/0253410 | A1 * | 12/2004 | Higgins et al. | 428/96 |
| 2004/0258870 | A1 | 12/2004 | Oakey et al. | |
| 2005/0037175 | A1 | 2/2005 | Loyd et al. | |
| 2005/0053760 | A1 | 3/2005 | Fowler | |
| 2005/0079316 | A1 | 4/2005 | Kobayashi | |
| 2005/0112320 | A1 * | 5/2005 | Wright | 428/95 |
| 2005/0281977 | A1 | 12/2005 | Mashburn | |
| 2006/0010804 | A1 | 1/2006 | Gray et al. | |
| 2006/0057328 | A1 * | 3/2006 | Pacione | A47G 27/0475 428/95 |
| 2006/0076100 | A1 | 4/2006 | Doney | |
| 2006/0240217 | A1 * | 10/2006 | Foss et al. | 428/97 |
| 2006/0251853 | A1 | 11/2006 | Ingram | |
| 2007/0087159 | A1 * | 4/2007 | Wright | 428/95 |
| 2007/0087160 | A1 * | 4/2007 | Wright | 428/95 |
| 2007/0254131 | A1 * | 11/2007 | Shail et al. | 428/95 |
| 2007/0269631 | A9 * | 11/2007 | Pacione | A47G 27/0475 428/95 |
| 2008/0113146 | A1 | 5/2008 | Wright et al. | |
| 2008/0233336 | A1 * | 9/2008 | Giannopoulos et al. | 428/95 |
| 2008/0241459 | A1 * | 10/2008 | Higgins | B32B 5/06 428/95 |
| 2008/0317997 | A1 * | 12/2008 | Wright | 428/95 |
| 2009/0011671 | A1 * | 1/2009 | Doesburg | C08G 18/0885 442/104 |
| 2009/0029097 | A1 * | 1/2009 | Riddle | C08G 18/2815 428/95 |
| 2009/0081406 | A1 * | 3/2009 | Higgins | B23B 5/06 428/95 |
| 2009/0159196 | A1 * | 6/2009 | Jenkines | 156/275.5 |
| 2009/0233040 | A1 | 9/2009 | Baumgartner et al. | |
| 2010/0051169 | A1 | 3/2010 | Sheppard | |
| 2010/0051745 | A1 | 3/2010 | Jones et al. | |
| 2010/0170991 | A1 | 7/2010 | Hobbs et al. | |
| 2011/0226901 | A1 | 9/2011 | Gonnsen | |
| 2012/0082820 | A1 * | 4/2012 | Salsman | C08J 5/18 428/95 |
| 2012/0110804 | A1 | 5/2012 | Hussmann | |
| 2012/0117777 | A1 | 5/2012 | Jones et al. | |

FOREIGN PATENT DOCUMENTS

| | | |
|---|---|---|
| CN | 101415544 | 4/2009 |
| CN | 102203340 | 9/2011 |
| DE | 102008058751 | 6/2010 |
| EP | 2331744 | 6/2011 |
| FR | 2 576 254 | 7/1986 |
| FR | 2 576 254 A1 | 7/1986 |
| GB | 2498896 | 7/2013 |
| HK | 1160893 | 8/2012 |
| HK | 1186155 | 3/2014 |
| JP | 59-120199 | 7/1984 |
| JP | 59120119 A * | 7/1984 |
| JP | H05300827 | 11/1993 |
| JP | 07-042065 A | 2/1995 |
| JP | 07257260 | 10/1995 |
| JP | 08084653 | 4/1996 |
| JP | 09-051844 A | 2/1997 |
| JP | 9051844 | 2/1997 |
| JP | 2003116706 | 4/2003 |
| JP | 2004500930 | 1/2004 |
| JP | 2005000541 | 1/2005 |
| JP | 2005002541 | 1/2005 |
| JP | 2005512885 | 5/2005 |
| JP | 2005-256527 | 9/2005 |
| JP | 2005533932 | 11/2005 |
| JP | 2006510464 | 3/2006 |
| JP | 2006106529 | 4/2006 |
| JP | 2006175074 | 7/2006 |
| JP | 2006518616 | 8/2006 |
| JP | 2007514471 | 6/2007 |
| JP | 2008100681 | 5/2008 |
| JP | 2008162399 | 7/2008 |
| JP | 2012501235 | 1/2012 |
| RU | 2131490 | 6/1999 |
| RU | 2531413 | 10/2014 |
| TH | 131181 | 1/2014 |
| WO | WO 01/94689 A2 | 12/2001 |
| WO | 03057956 | 7/2003 |
| WO | WO 03/103944 A1 | 12/2003 |
| WO | WO 2004/012108 A1 | 2/2004 |
| WO | 2004024438 | 3/2004 |

(56) References Cited

FOREIGN PATENT DOCUMENTS

| WO | WO 2004/067832 A2 | 8/2004 |
|---|---|---|
| WO | WO 2006/066191 A1 | 6/2006 |
| WO | 2007075279 | 7/2007 |
| WO | WO 2007/130118 A1 | 11/2007 |
| WO | WO 2009/059366 A1 | 5/2009 |
| WO | WO 2010/028049 A2 | 3/2010 |
| WO | WO 2010058027 | 5/2010 |
| WO | WO 2012054692 | 4/2012 |

OTHER PUBLICATIONS

Database WPI Week 198434, Thomson Scientific, London, GB; AN 1984-209354 (Asahi Chem Ind Co Ltd), XP002560293 &JP 59 120119 A, Jul. 11, 1984.
Database WPI Week 200569 Thomson Scientific, London, GB; AN 2005-668978, XP002560292 & JP 2005 256527 A (Suminoe Textile Co Ltd), Sep. 22, 2005.
U.S. Appl. No. 12/552,904, Office Action mailed on Nov. 4, 2010, 13 Pages.
U.S. Appl. No. 12/552,904, Office Action mailed on Jun. 13, 2011, 20 Pages.
International Application No. PCT/US2009/055739, International Preliminary Report on Patentability mailed on Mar. 17, 2011, 16 Pages.
International Application No. PCT/US2009/055739, International Search Report and Written Opinion mailed on Apr. 22, 2010, 27 Pages.
International Application No. PCT/US2009/055739, Partial Search Report mailed on Jan. 13, 2010, 9 Pages.
Communication pursuant to Article 94(3) EPC for EP Application No. 09 792 175.3-2124, mailed Dec. 8, 2011 (4 pages).
International Search Report and Written Opinion for PCT/US2011/057029, mailed Jan. 19, 2012 (17 pages).
Response to Communication pursuant to Article 94(3) EPC for EP Application No. 09 792 175.3-2124, filed Jun. 1, 2012 (19 pages).
First Office Action for Chinese Application No. 200980143243.8, mailed Jun. 21, 2012 (15 pages).
"International Preliminary Report on Patentability, PCT/US2011/057029, mailed May 2, 2013 (10 pages)".
"Second Office Action—Chinese Application No. 200980143243.8, mailed Apr. 15, 2013 (13 pages)".
"Office Action", U.S. Appl. No. 12/552,938 , Jan. 11, 2013, (28 pages).
U.S. Appl. No. 12/552,904, "Notice of Allowance", Aug. 29, 2011, 5 Pages.
U.S. Appl. No. 12/552,938, "Notice of Allowance", Aug. 21, 2013, 10 pages.
U.S. Appl. No. 13/277,416, "Non Final Office Action", Jul. 3, 2013, 15 pages.
U.S. Appl. No. 13/277,416, "Notice of Allowance", Feb. 11, 2014, 7 pages.
2011112780, "Russian Office Action", May 23, 2013, 8 pages.
CN200980143243.8, "Office Action", Jan. 6, 2014, 13 pages.
CN200980143243.8, "Office Action", Sep. 3, 2014, 6 pages.
CO11039490, "Office Action", Mar. 20, 2014, 15 pages (redacted).
CO11039490, "Office Action", Sep. 4, 2013, 37 pages (redacted).
EP09792175.3, "EPO Notice Regarding Amended Claims", Apr. 18, 2011, 2 pages.
IDW-00201101162, "Indonesian Office Action", May 27, 2013, 3 pages (redacted).
JP2011-525292 , "Office Action", Jul. 8, 2014, 5 pages.
JP2011-525292, "Office Action", Nov. 26, 2013, 7 pages.
MX/A/2011/002083, "Office Action", May 12, 2014, 2 Pages (redacted).
MX/A/2011/002083, "Notice of Allowance", Sep. 8, 2014, 3 Pages (redacted).
Indonesian Application No. W-00101101162, Notice of Allowance and notice of Letters Patent (Redacted), Oct. 29, 2014, 7 pages.
CN201180050663.9 , "Office Action", Apr. 3, 2015, 33 pages.
CO11-039490, "Office Action", May 29, 2015, 11 pages Redacted.
First Examination Report for Australian Patent Application No. AU2009288142, mailed Jul. 20, 2015, 6 pages.
Office Action for Canadian Patent Application No. CA2,735,652, mailed Jun. 26, 2015, 4 pages.
Office Action for Japanese Patent Application No. JP2014-227185, mailed Sep. 1, 2015, 8 pages.
Office Action for Korean Patent Application No. KR10-2011-7007681, mailed Aug. 18, 2015, 19 pages.
KR10-2011-7007681, "Office Action", Mar. 28, 2016, 8 pages (4 pages translation).

* cited by examiner

LOW WEIGHT-HARDBACK CARPET TILE

CROSS REFERENCE TO RELATED APPLICATION

This application claims priority to U.S. Provisional patent application Ser. Nos. 61/093,640, filed Sep. 2, 2008, and 61/163,907, filed Mar. 27, 2009 which are incorporated herein by this reference.

FIELD OF THE INVENTION

This invention relates to an improved carpet, and, in particular, to a light weight, dimensionally stable hardback carpet tile, and to shapes and methods of installation of such flooring, that are suitable for use, among other applications, in mass transit vehicles, particularly including aircraft.

BACKGROUND OF THE INVENTION

Mass transit vehicles—such as passenger aircraft, boats, trains, subway cars, and buses—frequently include carpeting in the passenger compartment of the vehicle. This carpeting is exposed to a particularly harsh environment—high traffic, dirt, heavy equipment (e.g., beverage carts), spills, and the like. In passenger aircraft, the carpeting is also subjected to cyclical forces due to repeated changes in cabin air pressure that cause the cabin itself and its floor or deck structure to stretch and widen during expansion cycles and contract during compression cycles. These environmental and other conditions necessitate frequent replacement of worn, dirty or damaged carpeting.

In view of the above considerations, carpeting in mass transit vehicles should be engineered to the extent possible for wear resistance and ease of installation and removal. In addition, in passenger aircraft and maritime applications, the carpet needs to meet industry specifications for flame, smoke and toxicity. Moreover, in aircraft applications, because of the relationship between aircraft weight and fuel efficiency—and thus operating costs—it is preferable to minimize carpet weight while maintaining the other functional properties discussed above as well as esthetic requirements and objectives.

Broadloom carpet has traditionally been used in mass transit applications. The carpet is typically cut into appropriately-sized strips, the edges of the carpet strips are bound ("serged") to prevent or minimize unraveling, the strips are positioned on the surface of the vehicle floor or deck, are further cut as necessary and are adhered to the floor or deck of the vehicle with adhesive. Broadloom carpet in these applications exhibits good strength and wear properties, but because the floor is carpeted with custom-cut strips sized to fit the vehicle, removal and replacement of damaged carpet sections is difficult and unnecessarily expensive, as damage to only one section of the strip can necessitate removal and replacement of the strip in its entirety. Moreover, in aircraft applications installation and replacement of broadloom carpet requires the carpet to be sized in the aircraft and removed for cutting, as cutting in-place could damage the skin of the aircraft.

In addition, in order to remove and replace the strips it is necessary to remove the seats and/or other equipment in the vehicle. In a passenger compartment of an aircraft, for example, replacement of a carpet strip can require the removal of several aircraft seats. Another drawback is that electronics mounted in the seats, e.g., audio connections and video screens, may also need to be removed or disconnected.

Carpet tiles can be an attractive choice for mass transit applications. Use of carpet tiles, which do not need to be serged, would simplify installation as compared to broadloom carpet. Carpet tiles can also allow for more efficient replacement of damaged carpet sections, since individual tiles can be replaced instead of entire strips of broadloom carpet. Another advantage of using carpet tile in aircraft applications is that if a tile needs to be cut it can be cut on a cutting board on the aircraft (unlike broadloom carpet).

Carpet tiles are generally produced and sold as squares. When non-square tiles are needed, square tiles are cut to the desired size. This is suitable for most commercial applications, but presents inefficiencies in mass transit applications. The floors of passenger aircraft have tracks that project from the floor and run most or all of the length of the passenger cabin to allow for installation of passenger seats of various sizes with various front-to-back seat separations and in various aircraft seating configurations. These tracks cannot be covered with carpet because they must remain accessible for attachment of seats. Although it may be possible for a seating configuration to be selected that utilizes tracks at equidistant lengths across the body, or breadth, of the aircraft, in almost all cases the seating configuration will require carpet to have several different widths in order to cover the entire breadth of the aircraft. When strips of broadloom carpet are utilized, strips are cut to match the widths between tracks, and the cut edges are usually bound. With conventional square carpet tiles, however, in order to cover the entire breadth of a passenger compartment, multiple tile sizes would be necessary for positioning in the different widths of gaps between the tracks without cutting tiles: e.g., if the aircraft requires four different broadloom strip carpet widths, then four different sized square carpet tile products would be required. Alternatively, larger tiles can be used by cutting them to the desired width, but this would be time consuming and wasteful.

In addition, carpet tiles—in any carpeting application—require good dimensional stability characteristics. Tiles should resist deformation and maintain their dimensions when subjected to varying temperatures, moistures, pressures, or other stresses. Among other things, carpet tiles that lack dimensional stability are more likely to buckle, or "dome" in the center of the tile and less likely to lie flat. Good dimensional stability characteristics are even more important in mass transit applications, where the tile is subjected to harsh environmental conditions as described above. Carpet tiles for use in passenger aircraft would also need to meet applicable specifications for flame, smoke and toxicity.

Current carpet tile technologies can produce carpet tiles having good dimensional stability and flame and smoke characteristics. Reissued U.S. Pat. No. Re. 34,951, incorporated herein by reference, describes one such carpet tile. Other prior art carpet tiles are described in U.S. Pat. Nos. 4,010,301, 4,010,302, 5,198,277, 5,204,155 and 5,560,972, the disclosures of which are incorporated herein by reference.

Each of these patents disclose carpet tiles that include a carpet pile embedded, tufted into or otherwise attached to a primary backing layer. These carpet tiles further include additional backing layers, which are formed from various materials and provide dimensional stability and strength to the carpet tile. Common backing layer materials include polyester, polyvinyl chloride, nonwoven glass fibers, and the like. In order to reduce the cost of backing, one or more fillers, such as calcium carbonate, are typically incorporated into the backing layer. These and most other conventional carpet tiles are relatively heavy, a not undesirable property because weight contributes to the ability of such tiles to lie flat and remain in place when installed.

While such conventional carpet tiles are suitable for many commercial and residential applications; they are not well adapted for applications in which light weight tile is desirable because they are relatively heavy, and this makes them less suitable for use in certain mass transit vehicles, particularly including passenger aircraft. Moreover, the broadloom carpet currently being used in mass transit vehicles, while perhaps lighter than conventional carpet tiles, have completely different dimensional stability characteristics that preclude the broadloom carpet from being cut into tiles and installed in the vehicle.

Accordingly, there is a need for a method of installing carpet tiles in spaces like those in mass transit vehicles that minimizes the number of different carpet tile products required to cover the breadth of that space and that does not require cutting of the tiles. There is also a need for a method of installing carpeting in a mass transit vehicle that does not require removal of equipment, such as passenger seats, from the vehicle. There is additionally a need for a low-weight, durable carpet tile for use in mass transit vehicles, and in particular passenger aircraft, that complies with applicable smoke, flame and other requirements.

SUMMARY OF THE INVENTION

This invention provides low weight carpet and hardback carpet tiles suitable for use in mass transit vehicles, and particularly passenger aircraft and in other applications where product weight, configuration, installation or other considerations like those described below are applicable. The carpet and carpet tile of this invention may have a carpet pile and at least one backing layer. The backing layer may use low weight filler such glass spheres, and preferably hollow glass microspheres. In another embodiment, the carpet and carpet tiles satisfy transportation industry standards for flame, smoke and toxicity. Tiles may be sized during manufacture and installed in configurations that minimize the number of tile sizes needed and minimize the need for cutting tiles during installation. The patterns used for such tiles may be orthogonally ambiguous or otherwise suitable for "random" installation, facilitating installation of tiles that may be positioned in use in different orientations than their orientation during manufacture. In other embodiments, a passenger aircraft cabin the flooring and installation methods described here facilitate original and replacement installation in aircraft or other vehicles or other location without removing seats or other obstructions. Such installations may include, for instance, floor having rectangular carpet tiles installed thereon, and the carpeting can be installed, removed and replaced in the aircraft without removing seats from the aircraft.

DETAILED DESCRIPTION OF THE INVENTION

Tile Geometry

Figure 1:
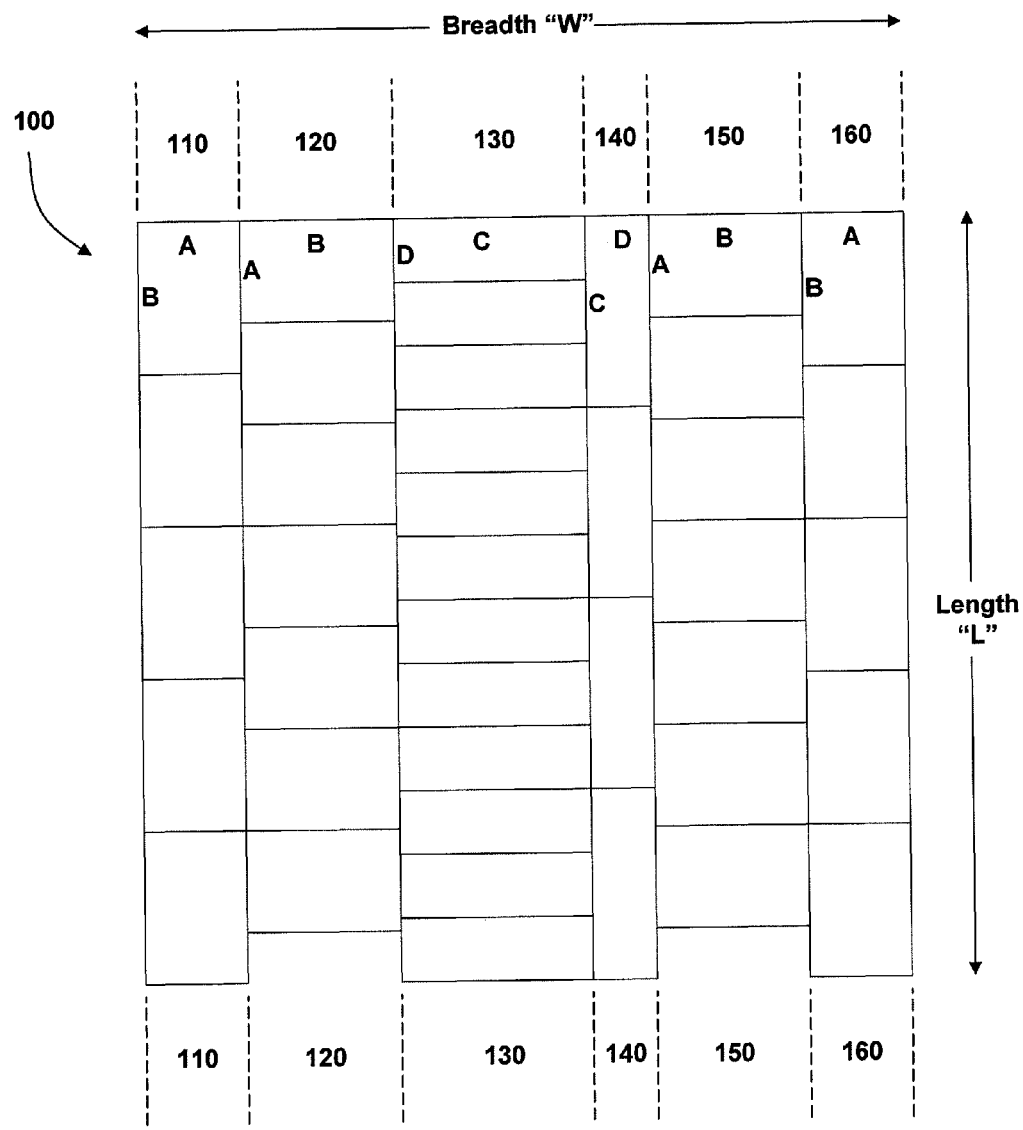
FIG. 1 is a diagram of a carpet tile configuration according to one embodiment of this invention.

One embodiment of this invention is a method for installing carpet tiles in a mass transit vehicle, and in particular a passenger aircraft. The method will be described as applied to a passenger compartment of a passenger aircraft, although the method can be applied to other mass transit vehicles, such as trains, buses, subway cars and boats.

According to the method, the passenger compartment is carpeted using a minimum number of different sizes of carpet tiles. As described above, because of various possible seating configurations in any given aircraft, the passenger compartment of an aircraft typically requires numerous different sizes of carpeting in order to span the entire breadth of the aircraft. An exemplary configuration is provided in FIG. 1. In the illustrated configuration, the passenger compartment of the aircraft 100 has a breadth W and length L. The seating configuration used in the aircraft necessitates carpet to be laid in six sections, 110, 120, 130, 140, 150 and 160, the sections having widths A, B, C, D, B and A, respectively. Note that sections 110 and 160 have the same width (A) and sections 120 and 150 have the same width (B).

In one embodiment of this invention, orthogonally ambiguous or random installation rectangular carpet tiles are sized to minimize the number of different carpet tile products required to carpet the passenger cabin. A first rectangular carpet tile product has a base that is equal to one of the required widths, e.g., width A, and a height that is equal to another of the required widths, e.g., width B. In this manner, the first rectangular carpet tile product can be used to carpet sections 110, 120, 150 and 160 by using base A of the first tile to cover the width of sections 110 and 160 and by using height B of the first tile to cover the width of sections 120 and 150.

A second rectangular carpet tile product has a base that is equal to another of the required widths, e.g., width C and a height that is equal to the last of the required widths, e.g., width D. Thus, the second tile can be used to carpet sections 130 and 140 by using base C of the second tile to cover the width of section 130 and by using height D of the second tile to cover the width of section 140.

The passenger compartment of the aircraft can thus be carpeted with only two different sizes of carpet tile products. If traditional square carpet tile products had been used, four different sizes of square products would have been required, the four products having sides of length A, B, C and D. By utilizing the described carpeting method, the number of different carpet tile products required for this embodiment can be cut in half (e.g., from four to two). Moreover, through use of the method described above, cutting of tiles from side-to-side (i.e., cutting the tile to adjust its width to fit into a particular section) can generally be avoided, although it will be recognized that some cutting may be required, such as at the forward and/or aft sections of the passenger compartment because the compartment is narrower there.

As will be appreciated by those skilled in the art, attractive installations of the rectangular carpet tiles of this invention are facilitated by use of carpet tile patterns like those described in U.S. Pat. Nos. 6,908,656 and 7,083,841 (which are incorporated herein by reference) that are acceptable in installations in which the fibers "face" in different directions as compared to the directions they "faced" during tile production. It should be recognized, however, that patterns on carpet webs that can be cut into square carpet tiles that are orthogonally ambiguous cannot necessarily be cut into rectangular tiles of any dimensions that will all be orthogonally ambiguous. This is because, with at least some patterns, tiles have to be sized and cut from a web with sufficient reference to the pattern on the web when cutting locations are selected to avoid creation on specific tiles of shapes that look out of place. Such shapes can sometimes occur when a tile edge is too close to the edge of a shape on the tile, making that shape sufficiently different from other shapes on the tiles to look odd or out of place.

Figure 2:
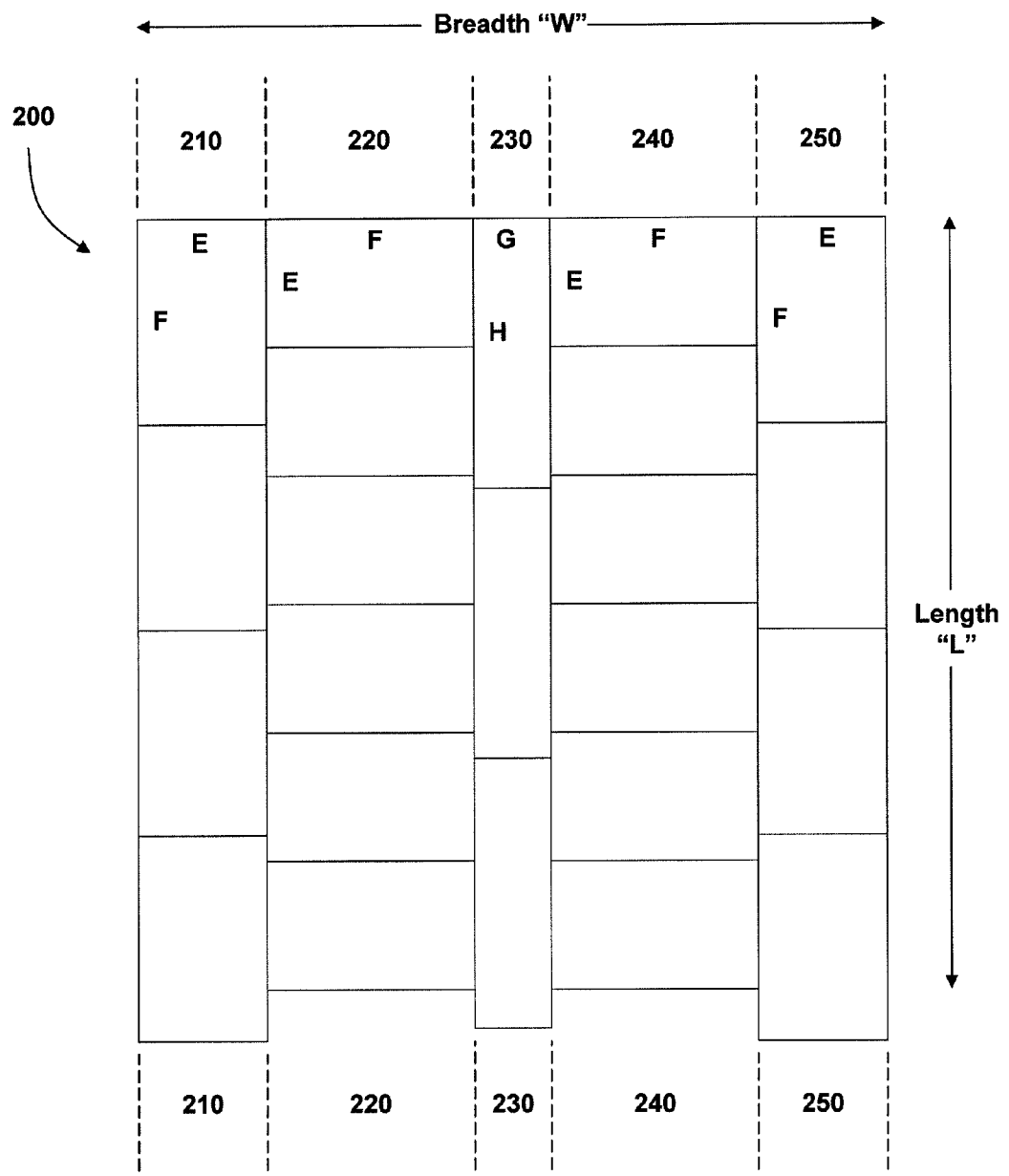
FIG. 2 is a diagram of a carpet tile configuration according to another embodiment of this invention.

In an exemplary embodiment of a method of this invention, an aircraft seating configuration necessitates carpet laid in five sections: 210, 220, 230, 240 and 250 as illustrated in FIG. 2. Sections 210 and 250 have the same width E, and sections 220 and 240 have the same width F. Section 230 has width G.

In this embodiment, a first rectangular carpet tile product has a base that is equal to one of the required widths, e.g., width E, and a height that is equal to another of the required widths, e.g., width F. In this manner, the first rectangular carpet tile product can be used to carpet sections 210, 220, 240 and 250 by using base E of the first tile to cover the width of sections 210 and 250 and by using height F of the first tile to cover the width of sections 220 and 240.

A second rectangular carpet tile product has a base that is equal to another of the required widths, e.g., width G, which can be used to carpet section 230. As there are no other sections that need to be carpeted in this configuration, the height H of the second rectangular carpet tile is not important and any desirable height can be selected. Alternatively, the height H can be chosen to equal one of the needed widths E or F.

Thus, in this embodiment the passenger compartment of the aircraft can be carpeted with two different sizes of carpet tile products. If traditional square carpet tile products had been used, three different sizes of square products would have been required, the three products having sides of length E, F and G. Because there are an odd number of required section widths in this configuration, the number of different carpet tile products cannot be reduced in half, but can be determined by the formula $$(n-1)/2+1;$$

where n equals the number of different carpet section widths spanning the breadth of the passenger compartment. The value for n in the embodiment illustrated in FIG. 2 is three, which represents the number of carpet sections having different widths—there are five sections that need to be covered, but two of the sections have the same width, leaving three different widths (E, F and G). Thus, the number of different carpet tiles required in this embodiment is (3−1)/2+1, or two. In an exemplary configuration having five sections of different widths, the number of different carpet tile products can be reduced to (5−1)/2+1, or three.

It will be recognized that if a particular aircraft configuration requires carpet to be laid in sections having an even number of different widths (such as the embodiment described above, illustrated in FIG. 1), the number of different carpet tile products required can be represented by the formula $$\tfrac{1}{2}n,$$

where n is defined as above.

The carpet tiles can be installed in the vehicle using traditional adhesives. Such adhesives include, but are not limited to, latex, hot-melt adhesives, and water-based adhesives. Exemplary adhesives include bitumen-based hot-melt adhesives, polyurethane adhesives, polyethylene adhesives, thermoplastic polyolefin adhesives, pressure sensitive acrylic adhesives and combinations thereof. Preferably, an adhesive is selected such that it leaves little, if any, residue on the floor of the aircraft when the tile is removed, although the adhesive need not be so limited. A preferred adhesive is an "APAC" acrylic adhesive available from the All Purpose Adhesive Company, of Dalton, Ga. Other adhesives for applying carpet tiles to a floor are known.

The adhesive can be applied directly to the floor or on the tile when the carpet is to be laid, or it can be pre-applied to the carpet tile during construction as a releasable adhesive layer, which can be covered with a peel away strip, film or sheet of material such as paper, plastic or the like. One releasable adhesive is AquaBlock pressure sensitive adhesive sold by Rohm and Haas. The carpet tiles of this invention can also be installed using double sided tape such as that which is available from Adchem Corporation in Riverhead, N.Y.

Alternatively, the carpet tiles can be installed on the floor of the aircraft using adhesive connectors or squares such as the TacTiles® product developed by Interface, Inc. TacTiles® adhesive connectors are approximately 3" polyester film connectors formed from a compounded acrylic adhesive applied to a polyethylene terephthalate (PET) backing with a PET polyester release liner. The connectors are designed to adhere corners or edges of carpet tiles together. The TacTiles® connectors, however, only adhere the carpet tiles to each other and are not adhered to the floor (i.e., the adhesive is only on one side of the TacTiles® connectors), thus creating a "floating floor." Once installed, the TacTiles® connectors provide excellent horizontal adhesion to prevent the tiles from pulling apart from each other, but carpet tiles are easily released from the TacTiles® connector by pulling on the tile vertically. Use of TacTiles® connectors thus greatly simplifies installation and removal of the carpet tiles.

If "floating floor" carpet tile installations without any attachment to the vehicle are considered undesirable in vehicles like airplanes, among other alternatives, selected attachment can be accomplished utilizing two sided adhesive tape, adhesive applied directly to the vehicle floor and or portions of the carpet tiles or by adhesively attaching at least some of the TacTiles® connectors to the floor. In yet another alternative installation, the tiles may be "free laid" with no means of attachment to the underlying floor or to each other.

Use of carpet tiles in accordance with the methods described above allows for the floor of a mass transit vehicle to be carpeted without removal of seats and/or other equipment from the vehicle.

Example 1

A carpet to be installed in a cabin of a Boeing 737-700 Series aircraft requires carpet to be laid in six sections (110, 120, 130, 140, 150 and 160) as illustrated in FIG. 1 (not drawn to scale for this Example). Seat tracks are located lengthwise in the cabin between sections 110 and 120, 120 and 130, 140 and 150 and 150 and 160. Emergency lighting tracks are located lengthwise in the cabin between sections 130 and 140.

The configuration of this example requires the following widths:

| Section | Width (inches) |
| --- | --- |
| 110 | 18 |
| 120 | 19.25 |
| 130 | 32 |
| 140 | 14 |
| 150 | 19.25 |
| 160 | 18 |

Note that these sections have four different width requirements (18, 19.25, 32 and 14 inches) and that sections 110 and 160 have the same width and sections 120 and 150 have the same width.

Carpet tiles can be sized for installation in this cabin using only two different sizes of tiles by sizing one tile to have a length of 18" and width of 19.25" and another tile to have a length of 32" and width of 14". The 18×19.25 tiles can be installed in sections 110, 120, 150 and 160 and the 32×14 tiles can be installed in sections 130 and 140.

Example 2

A trial installation was completed in a mock-up of a deck configuration of a Boeing 737-700 Series aircraft. The initial configuration was identical to that described above in Example 1. In considering this installation, however, it was realized that section 130, with a width of 32", could be filled with tiles having widths of 14" and 18" (14+18=32). Thus, tiles with the following widths were required:

| Section | Width (inches) |
| --- | --- |
| 110 | 18 |
| 120 | 19.25 |
| 130 | 14 and 18 |
| 140 | 14 |
| 150 | 19.25 |
| 160 | 18 |

There were thus only three different width requirements: 18" (sections 110, 160 and a portion of section 130); 19.25" (sections 120 and 150); and 14" (section 140 and a portion of section 130). Two different sizes of tiles were still required (((3−1)/2)+1=2 per the formula discussed above), however, it was recognized that the following tile dimensions could be utilized: 18"×19.25" and 14"×19.25". By sizing the tiles in this manner, a uniform length of tile (19.25") was used for each tile, which dramatically simplified the cutting of these tiles from the custom web and minimized cutting waste, since a die with a uniform length of 19.25" could be used.

Example 3

A carpet to be installed in a cabin of a Boeing 777 Economy Class aircraft requires carpet to be laid in nine sections with the following widths:

| Section | Width (inches) |
| --- | --- |
| 1 | 7 |
| 2 | 32.5 |
| 3 | 39.5 |
| 4 | 20.5 |
| 5 | 20.5 |
| 6 | 20.5 |
| 7 | 39.5 |
| 8 | 32.5 |
| 9 | 7 |

These nine sections have four different width requirements (7, 32.5, 39.5 and 20.5 inches) and the following sections have the same widths: 1 and 9 (7 inches); 2 and 8 (32.5 inches); 3 and 7 (39.5 inches) and 4-6 (20.5 inches).

Carpet tiles can be sized for installation in this cabin using only two different sizes of tiles by sizing one tile to have a length of 7" and width of 32.5" and another tile to have a length of 39.5" and width of 20.5". The 7×32.5 tiles can be installed in sections 1, 2, 8 and 9 and the 39.5 by 20.5 tiles can be installed in sections 3-7.

Example 4

The configuration of Example 3 could be modified by splitting sections 3 and 7 into two additional sections having widths of 7" and 32.5" as follows:

| Section | Width (inches) |
| --- | --- |
| 1 | 7 |
| 2 | 32.5 |
| 3 | 7 and 32.5 |
| 4 | 20.5 |
| 5 | 20.5 |
| 6 | 20.5 |
| 7 | 7 and 32.5 |
| 8 | 32.5 |
| 9 | 7 |

These nine sections now have only three different width requirements (7, 32.5 and 20.5 inches) and the following sections have the same widths: 1, 9 and a portion of sections 3 and 7 (7 inches); 2, 8 and a portion of sections 3 and 7 (32.5 inches); and 4-6 (20.5 inches).

Carpet tiles can be sized for installation in this cabin using only two different sizes of tiles by sizing one tile to have a width of 7" and length of 20.5" and another tile to have a width of 32.5" and length of 20.5". The 7×20.5 tiles can be installed in sections 1, 4-6, 9 and a portion of sections 3 and 7 and the 32.5 by 20.5 tiles can be installed in sections 2, 4-6, 8 and a portion of sections 3 and 7.

As with the configuration described above in Example 2, the cutting of these tiles is simplified by using a uniform length (20.5") for each tile.

Carpet Tile Weight

Figure 3:
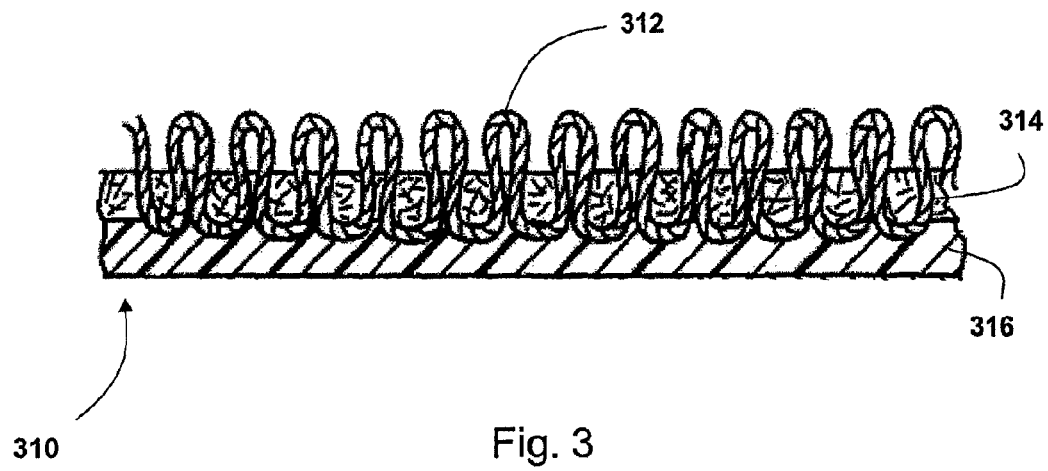
FIG. 3 is a schematicized side view of one embodiment of the carpet of this invention with at least one secondary backing layer.

Another embodiment of this invention is a low-weight hardback carpet tile suitable for mass transit applications. The carpet tile includes a carpet pile tufted or otherwise embedded in or attached to a primary backing layer and optionally having at least one additional, and optionally more, backing layer or layers, as illustrated in FIG. 3, where the carpet 310 has face yarn 312 tufted into a tufting primary 314 and a precoat layer 316. Such a structure having yarn tufted into a tufting primary and, optionally, a precoat layer is sometimes referred to as a "facecloth."

Figure 4:
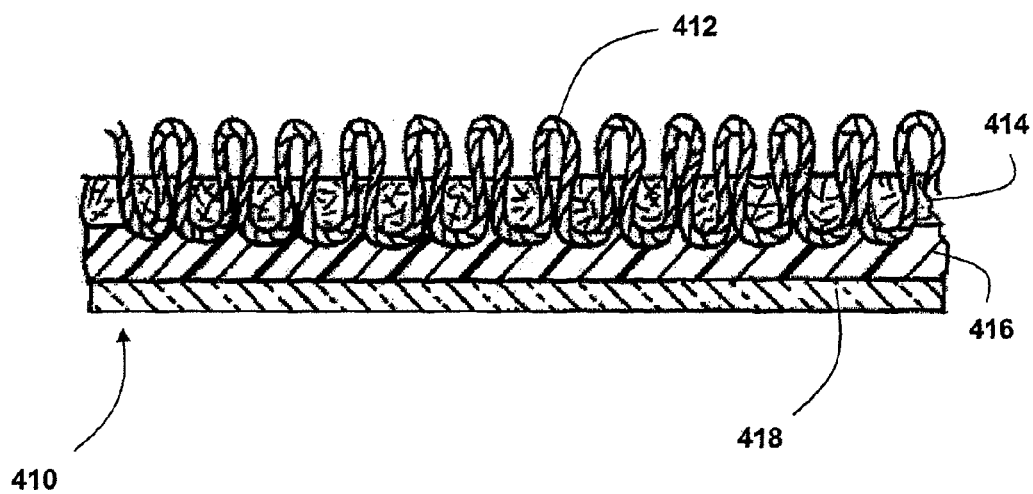
FIG. 4 is a schematicized side view of a second embodiment of the carpet of this invention with at least two secondary backing layers.

FIG. 4 illustrates another alternative embodiment as carpet tile 410 having an additional, secondary backing layer 418, together with yarn 412 tufted into tufting primary 414 and precoat layer 416. Tufting primary 414 and precoat layer 416 can be formed from the same materials described above for tufting primary 314 and precoat layer 316.

Additional backing layers and components are possible, as are other carpet constructions than tufted. For instance, the face yarn structure can be woven or fusion bonded, among other alternatives.

In one embodiment, the face fabric is formed from nylon yarn, and, in particular from Nylon 6.6 or Nylon 6 yarn. However, other yarns can be used to form the carpet pile, including, but not limited to wool, wool/nylon blends, fibers from polyester, polypropylene, polyetherimide (PEI), and polylactic acid (PLA), and other types of fibers known for use in carpet applications.

An appropriate material for the tufting primary layer (314, 414) of the low-weight carpet tile is non-woven polyester. Other tufting primary layer materials are known and usable provided that they contribute to (or at least do not unduly detract from) the properties of stability, durability, low weight and other desirable properties described herein.

The precoat layer (316, 416) is formed from polymeric materials such as polyvinyl chloride, styrene butadiene rubber (SBR), styrenated acrylic copolymer, acrylic, ethylene vinyl acetate (EVA), polyethylene, ethylene propylene dienemethylene terpolymer (EPDM) rubber, urethane, nitrile rubber, neoprene rubber, and chloroprene rubber. It can also be formed from a bituminous coating material. The precoat layer (316, 416) may be a styrenated acrylic copolymer available from Broadview Technologies, of Newark N.J., which has good flame resistance properties and has good compatibility with both the tufting primary layer and secondary backing layer.

Secondary backing layer 418 preferably includes a mesh or mat reinforcing layer with a polymeric material such as a polyvinyl chloride, polypropylene, or polyethylene terephtalate (PET) incorporated therein. The reinforcing layer is preferably formed from flame retardant materials such as fiberglass, ceramic, or polyvinyl chloride fibers and can have a woven or nonwoven structure. A particularly preferred secondary backing layer includes polyvinyl chloride incorporated into a nonwoven fiberglass mat. One usable polyvinyl resin is the PVC acrylic copolymer Geon-138 resin available from PolyOne. A wide range of alternative commercial PVC resins are also usable, provided that they offer the desirable qualities described herein and other suitable properties known to those of ordinary skill in the manufacture of carpet tiles.

The secondary backing layer can further include a plasticizer to increase the flexibility of the layer. Usable plasticizers include ester phosphate, di-iso-nonyl phthalate (DINP), tricresyl phosphate (TCP), triphenyl phosphate isopropylated (TPP), castor bean-based plasticizers, and combinations thereof. A combination of TPP and ester phosphate is a preferred plasticizer. TPP is available from Great Lakes Chemical Corp., and ester phosphate is available from PAG Holdings. Other plasticizers are known and may be used as appropriate.

It may also be desirable to incorporate an optional smoke suppressant into the secondary backing layer. A useable smoke suppressant is molybdenum trioxide, available from Climax Molybdenum Co., located in Climax, Colo.

The carpet pile of this invention preferably has a reduced weight as compared to conventional carpet tiles. Weight reduction can be achieved by using low weight face constructions. Suitable face fibers are nylon, wool, blends of nylon and wool and other known carpet fibers.

In addition, the tufting primary layer (314, 414) and additional layers (e.g., 316, 416 and 418) preferably weigh less than comparable layers found in most conventional carpet tiles. The reduced weight in these layers may be achieved by using a low-weight filler in place of known filler materials. As discussed above, use of light-weight filler materials has previously not been contemplated for carpet tile because low weight has not been a significant consideration in previous carpet tile constructions.

Glass spheres and, in particular, hollow glass microspheres are useable light-weight filler materials. One such microsphere filler material is Q-CEL® 300 Hollow Microspheres, available from Potters Industries, Inc., of Valley Forge, Pa. Other suitable filler materials include fumed silica, aerogel (a silica-based foam available from Aspen Aerogels, Inc.), fly ash, calcium carbonate, zinc borate, aluminum trihydrate, magnesium hydroxide and fiberglass staple fibers. Some of these materials provide flame resistant properties, which would be desirable in a carpet tile designed for aircraft or other vehicle applications. Glass microspheres may be preferable, however, because of their light weight and flame resistant properties. Q-CEL® Hollow Microspheres, for example, are formed from sodium silicate, sodium borate, water and precipitated silica. These are expensive, however. Other less expensive hollow microspheres are available and would also be suitable for use as filler materials. The hollow microspheres provide bulk to the backing layer(s) that is comparable to other filler materials, such as calcium carbonate, but at a substantially reduced weight. Calcium carbonate, for example, has a density of approximately 2.7 g/cc, while the Q-CEL® 300 Hollow Microspheres have a density of only about 0.12 g/cc.

In addition to physically adding filler materials to the backing layers, bulk can be provided to the backing layers without a substantial increase in weight through mechanical or chemical treatment processes. For example, interstices can be introduced into one or more of the backing layers by blowing, or frothing, the layer with air, nitrogen, or some other inert gas. An example of a chemical bulking means suitable for use in the backing layers is provided by Expancel, which is an expandable microsphere incorporating a drop of liquid isobutane surrounded by a polymeric shell. When exposed to heat, the shell softens and the isobutane gasifies, causing expansion of the microsphere.

Weight reduction can also be achieved by reducing the weight of the face yarns (312, 412) in the carpet pile. A typical carpet pile is formed from 4-ply face yarn, and is configured in either a loop or cut-pile arrangement. By reducing the face yarn to 3-plies, the weight of the carpet pile can be reduced from about 18-20 osy (ounces per square yard) to approximately 16 osy or less, and more preferably approximately 14 osy or less. Alternatively, lower weight 4-ply face yarns can be used by tufting the finished yarn ends in a lighter format, such as by varying the number of stitches per inch, the pile height, the gage of the machine or some combination of these. When low face weights of yarn are used, a black (or other dark color) tufting primary can be used to reduce "grinning," visible tufting primary between yarns. The static electricity dissipation characteristics of finished carpet fibers can be improved by incorporating a conductive material such as carbon black or conductive fiberglass.

As discussed above, any carpet tiles used in mass transit vehicles, such as passenger aircraft, should preferably satisfy applicable specifications for flame, smoke and toxicity. The carpet tile thus preferably satisfies one or more of the following standards: Federal Aviation Regulation ("FAR") 25.853 (compartment interiors), Boeing BSS 7239 (toxic fumes), Boeing BSS 7238 (optical smoke density), Boeing D6-51377 (smoke toxicity), and Boeing BSS 7230 ("Determination of Flammability Properties of Aircraft Materials"). These standards are incorporated by reference herein in their entirety.

In order to satisfy one or more of these standards, if the tufting primary layer (314, 414) is a spunlaid nonwoven polyester, available, for example, from Freudenberg Nonwovens NA, under the brand name Lutradur®, that backing can be treated with phosphate or antimony to improve its flame retardant properties.

The carpet tile can also include an additional layer (not illustrated in the figures) of a flame retardant latex material, available, for example, from Broadview Technologies, of Newark, N.J. If desired for additional flame and fire resistance, this layer can be included in addition to the flame-resistant primary backing layer described above. The precoat can be highly frothed in order to reduce the amount required to 10 or fewer ounces per square yard ("osy").

Figure 5:
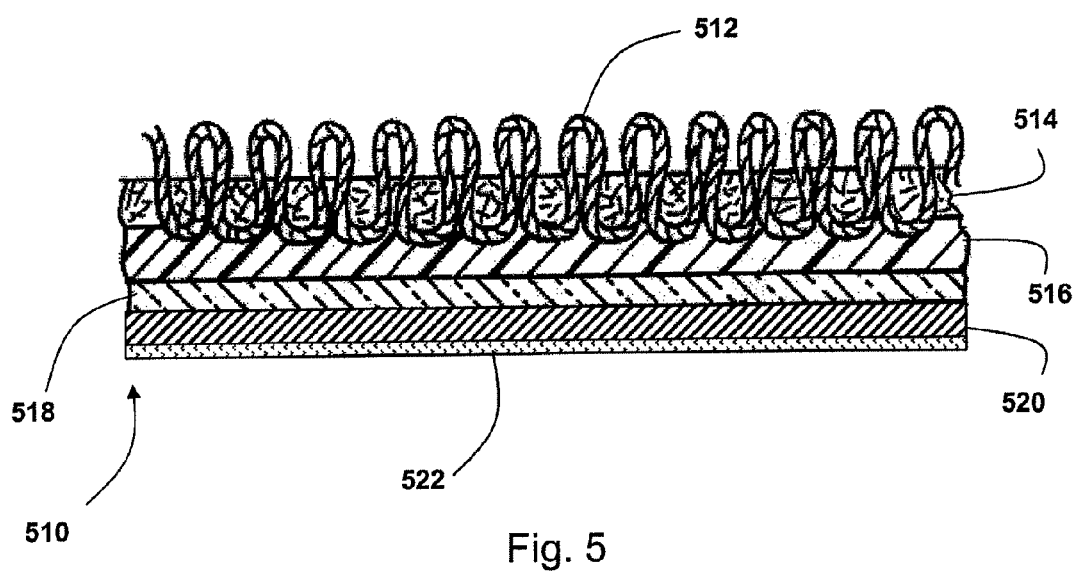
FIG. 5 is a schematicized side view of a third embodiment of the carpet of this invention with an additional optional backing layer.

The carpet tile can include another optional layer such as a fiberglass layer, as is illustrated in FIG. 5 depicting a carpet tile 510 having a face yarn 512 tufted into a tufting primary 514 and backed with a precoat layer 516, secondary backing layer 518 and fiberglass layer 520. Fiberglass layer 520 provides additional dimensional stability to the carpet tile, which is useful in aircraft and other mass transit applications. Another optional layer is illustrated as an adhesive layer 522 pre-applied to the carpet tile during construction.

A fiberglass material for both the secondary backing layer 418 and optional additional fiberglass layer 520 is non-woven microdenier fiberglass, available, for example, from Owens Corning Fiberglas Company, of Toledo, Ohio. Microdenier fiberglass: generally has good flame and smoke characteristics; the fibers are smaller than traditional fiberglass materials and are thus less of a skin irritant; and backing layers formed therefrom are less susceptible to buckling due to pressurization and depressurization of the aircraft cabin. In addition, microdenier fiberglass is less porous than traditional fiberglass, and therefore creates a more solid surface per unit weight than traditional fiberglass. Notwithstanding the properties of microdenier fiberglass, other materials, including conventional fiberglass backing materials, can be used.

As discussed, the low weight carpet tile described herein preferably offers favorable dimensional stability characteristics. One method for measuring the dimensional stability of the tile is specified in International Organization for Standardization (ISO) 2551, also known as the Acchen test for dimensional stability. A low weight carpet tile described herein preferably has a dimensional stability as determined by ISO 2551 of +/−0.2% (a change in tile size of no greater than 0.2% in either direction), and more preferably +/−0.1% (a change in tile size of no greater than 0.1% in either direction).

Static electricity dissipation may be desirable in some applications of this invention. For instance compliance may be desired with ANSI/ESD 520.20, which is an Electrostatic Discharge Association standard for development of an electrostatic discharge control program for protection of electrical and electronic parts, assemblies and equipment. It may also be desirable for the carpet tiles to comply with electrostatic discharge specifications promulgated by the manufacturer of the vehicle (e.g. aircraft) into which the carpet tile will be installed. To facilitate compliance, a conductive filament or other component such as carbon black, metal fiber or conductive fiberglass can be incorporated in each yarn end for dissipation of static electricity. For example, using a three ply yarn, it is possible to ply or air entangle a conductive filament with the other three yarns. Alternatively, or in combination, a conductive material such as carbon black can be incorporated into one or more of the backing layers.

Carpet tiles incorporating the materials described above can be made with a substantially lower weight as compared to current carpet tiles. Typical carpet tiles have weights ranging from about 120 to about 130 osy. In contrast, carpet tiles formed from the materials described above can have weights of less than approximately 100 osy. While carpet tiles having a weight of approximately 82-100 osy are suitable, tiles having a weight of approximately 66-82 osy are preferred. Even more preferable are carpet tiles having a weight of approximately 56-66 osy. Most preferred are carpet tiles having a weight of approximately 48-56 osy or even 42-48 osy. Lower weight tiles are preferred for use in passenger aircraft applications.

Example 5

The following formulation has been used for the secondary backing layer described above:

| Material/Function | Specific Material | Source/Brand |
|---|---|---|
| Resin | PVC acrylic co-polymer dispersion | Geon ™ 138 from PolyOne |
| Plasticizers | Triphenyl phosphate isopropylated (TPP) | Great Lakes Chemical Corp. |
|  | Ester phosphate | Fosflam ™ from PAG Holdings |
| Filler | Glass microspheres | Q-CEL ® 300 Hollow Microspheres from Potters Industries, Inc. |
| Smoke suppressant | Molybdenum trioxide | Climax Molybdenum Co. |

Manufacture

Figure 6:
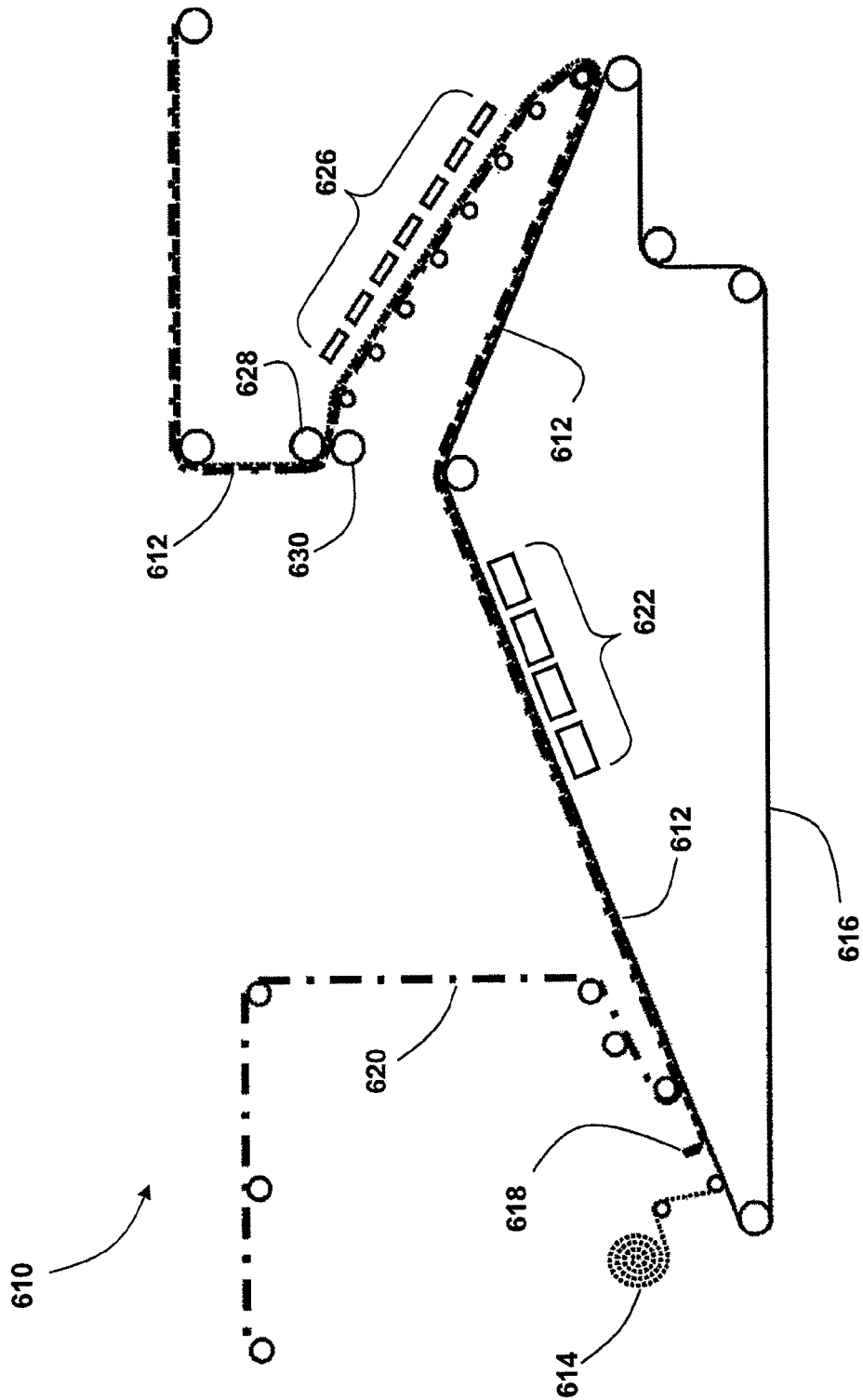
FIG. 6 is a schematicized side view of a carpet backing line for producing carpet in the manufacture of one embodiment of the carpet tile of this invention.

Low weight (and other) carpet tile may be manufactured by producing a composite carpet web 612 depicted in FIG. 6, utilizing a process including:

Laying fiberglass web 614 onto an advancing belt or other suitable support structure in a carpet manufacturing line;

applying a resin layer 618 (as depicted above in Example 5) onto the fiberglass web 614;

laying in tufted facecloth 620 on the resin layer 618, heating the composite carpet web 612 to lower the viscosity of the resin layer 618 and begin curing it;

applying pressure by contacting the composite carpet web 612 with at least one embossing, nip or similar pressure-exerting roller ("pressure roller") that does not have stops or is otherwise configured to exert significant pressure as further described below.

Figure 6A:
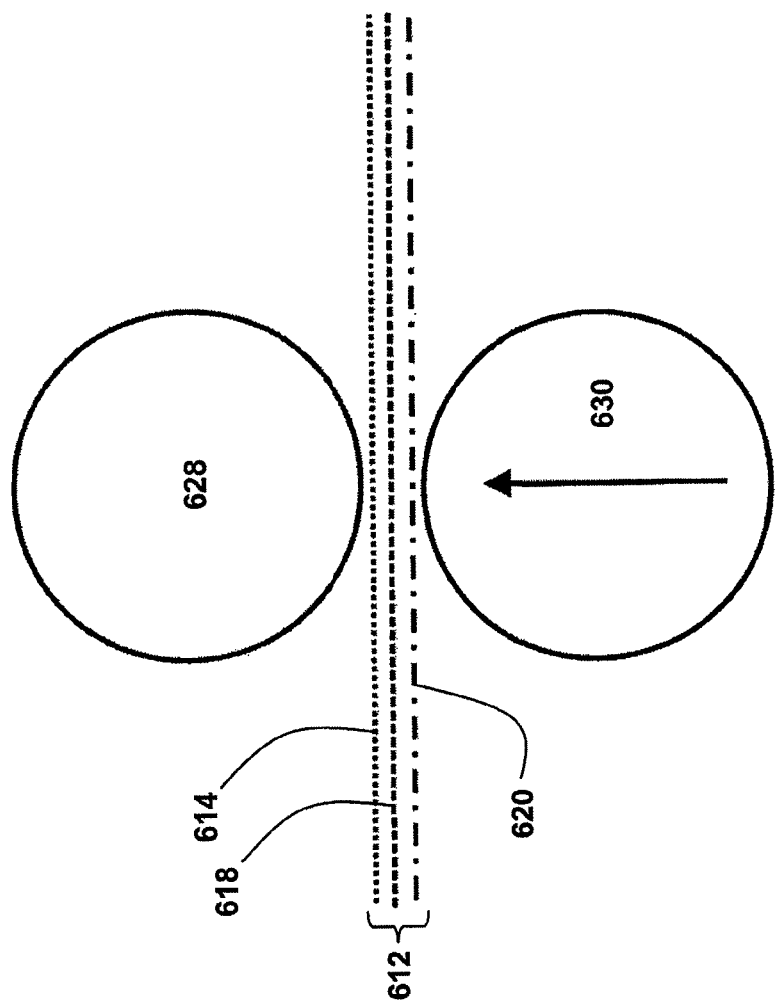
FIG. 6a is a schematicized side view of a portion of the backing line of FIG. 6.

FIGS. 6 and 6a are schematicized side views of a backing line 610 usable to manufacture a composite carpet web 612 of this invention by unrolling a fiberglass web 614 onto an advancing lower belt 616. A resin layer 618 is deposited on the top of the fiberglass web 614, and tufted or other facecloth 620 is laid into the resin layer 618. The fiberglass web 614 and resin layer 618 form the secondary backing layer 418 described above. The composite carpet web 612 is heated by, for instance, passing it over heated platens 622. The platens 622 can be heated by hot oil, steam, electricity, or some other heat source. The heated resin in the resin layer 618 begins to cure and its viscosity goes down. The composite web should preferably be heated to at least about 315° F. Additional heat is supplied by infrared (IR) heaters 626 positioned adjacent to the secondary backing 418 of the composite carpet web 612 just before the composite carpet web 612 passes between pressure rollers 628 and 630.

The composite carpet web 612 typically cools in ambient air, and is then accumulated onto a roll (not illustrated). Alternatively, rather than being rolled, cooled composite carpet web 612 can advance immediately to a cutting station (not illustrated) and be cut into desired sizes of tile.

The heat profile during manufacture is important. Good results are obtained by keeping the composite carpet web 612 at a relatively constant temperature throughout most of the manufacturing cycle and by utilizing additional heaters 626 just before the composite carpet web 612 passes between the pressure rollers (628, 630), which forces some of the molten resin into and around the backstitches or tuft portions embedded in the tufting primary 314, 414. Such backstitches are formed, for instance in, face yarn 312 (in FIG. 3) in the tufting primary (e.g., tufting primary 314 in FIG. 3). The elevated temperature of the backing material at the pressure rollers (628, 630) causes the viscosity of the resin layer 618 to decrease, which facilitates the improved penetration of the backing material into the tufting primary.

Exertion of substantial pressure with pressure rollers 628 and 630 facilitates formation of a lighter, stronger composite carpet web 612. This may be achieved with conventional opposed pressure rollers 628 and 630 by omitting the stops typically associated with at least one of the pressure rollers 628 and 630. The stops are used in most carpet manufacturing applications to limit travel of one or both of the rollers toward each other, thereby maintaining a minimum separation between the rollers to prevent crushing of the face yarn (312, 412). Removal of the stops allows the still-hot backing material to be pressed further into and around the backstitches in the tufting primary (314, 414), allowing a strong composite carpet web 612 to be formed using less backing material. Undesirable crushing of the face yarn (312, 412) is limited, apparently because the application of significant force by the rollers is very brief.

If desired, hydraulic or other mechanical means of pressure can be applied to one or both of the pressure rollers.

Roller 628 may be a steel roller or other similar material and may be a conventional embossing roller or another roller capable of exerting pressure on the backing material as described herein. Roller 628 is preferably stationary, i.e., it does not move normal to the face of the composite carpet web 612 (but it does rotate). This roller can be chilled to facilitate "locking" the backing material into the tufts of the facecloth.

Roller 630, which contacts the face yarns, need not, and typically should not, transmit heat to the face yarns it contacts and may have a roller face of rubber or other similar material. Roller 630 is preferably not stationary, i.e., it can move normal to the face of the composite carpet web 612 (toward and away from roller 628. Roller 630 can also be chilled.

Rollers 628 and 630 are typically approximately 11-13" in diameter. As discussed above, pressure can be applied onto one or more of the rollers in an amount such that undesirable crushing of the facecloth does not occur. In a configuration where a 90" long rubber coated roller (628) having a 13" diameter is driven upwards by a pair of pneumatic pistons having a diameter of approximately 1.5", pressure of up to 75 pounds per square inch on the pistons has been applied without resulting in undesirable crushing of the face cloth. Other pressures can be used with other piston and roller sizes and in order to accommodate other variations in the backing materials, face yarns or otherwise.

The composite carpet web can pass between the rollers (628, 630) at a suitable speed that will allow the resin in the resin layer 618 to be pressed into the tufts in the face cloth 620 without crushing the face cloth 620 and that will allow for sufficient heat transfer and curing of the resin in the composite web 612. A line speed of 20 feet per minute has been found to be suitable. Other line speeds can be used provided they provide sufficient curing time for the resin in the composite web 612.

Benefits resulting from this manufacturing technique include:

1) Use of less backing material. The combined heat and pressure push the resin into the interstices of the tufted facecloth 620 to provide better tuft lock and resistance to delamination.

2) The fiberglass secondary backing layer is driven almost (if not entirely) into the carpet web composite so that the fiberglass is not exposed. This allows use of a less expensive fiberglass than the expensive non-irritating fiberglass products often used when the fiberglass is exposed for possible contact by installers. Moreover, the performance of the tile improves because, typically, fiberglass closer to the face provides better dimensional stability and less fiberglass wrinkling.

3) The application of pressure essentially corrects backing imperfections that can telegraph to the face and cause uneven wear. More direct contact between facecloth and backing improves product appearance when it becomes worn. The heat and pressure smoothes out the backstitch profile.

4) If the resin composition is too viscous in conventional carpet tile production, it is hard to drive the fiberglass into the resin. This is not of as much concern, however, when manufacturing in accordance with this invention, because pressure is used to push the fiberglass towards the carpet face. This permits use of more viscous resin composition and, therefore, less of it than in some conventional manufacturing processes.

5) Using less resin:
   reduces the size or "footprint" of the backing line by approximately half,
   reduces backing cure time (thereby requiring a shorter belt) and avoids the need to re-heat to laminate to facecloth,
   makes curing easier,
   produces easier-to-cut tiles,
   reduces weight,
   makes it easier to push the fiberglass in the secondary backing closer toward the "top" or face of the tile (because less resin composition has to move through the fiberglass), and
   less space is needed to ship and store tiles, making it possible to package more tiles in a particular size carton.

The foregoing is provided for the purpose of illustrating, explaining and describing embodiments of the present invention. Further modifications and adaptations to these embodiments will be apparent to those skilled in the art and may be made without departing from the spirit of the invention or the scope of the claims. Moreover, all aspects of the invention need not necessarily be practiced in every embodiment of the invention. For instance, some embodiments of this invention may be manufactured and installed in broadloom configurations and others may utilize square tiles. Other embodiments may not use light weight fillers or may not utilize pressure rollers as described herein in manufacture of the product.

What is claimed is:

1. A carpet tile comprising:
   a. yarns tufted into a tufting primary layer;
   b. a flame retardant layer below the tufting primary layer; and
   c. a secondary backing layer, wherein the secondary backing layer comprises a flame retardant and a filler,
wherein the carpet tile is a hardback carpet tile and has a weight of approximately 42 to 66 ounces per square yard.

2. The carpet tile of claim 1, wherein the yarns weigh approximately 16 ounces per square yard or less.

3. The carpet tile of claim 1, wherein yarns weigh approximately 14 ounces per square yard or less.

4. The carpet tile of claim 1, wherein at least some of the yarns comprise a conductive material that dissipates static electricity.

5. The carpet tile of claim 1, wherein the tufting primary layer comprises a flame retardant.

6. The carpet tile of claim 1, wherein the tufting primary layer comprises a dark colored material.

7. The carpet tile of claim 1, wherein the secondary backing layer comprises aluminum trihydrate.

8. The carpet tile of claim 1, wherein the filler comprises hollow microspheres.

9. The carpet tile of claim 8, wherein the hollow microspheres comprise glass.

10. The carpet tile of claim 9, wherein the hollow microspheres are flame resistant.

11. The carpet tile of claim 1, wherein the secondary backing layer further comprises a smoke suppressant.

12. The carpet tile of claim 1, wherein the secondary backing layer further comprises a flame resistant reinforcing layer.

13. The carpet tile of claim 1, wherein the secondary backing layer further comprises a polymeric material.

14. The carpet tile of claim 13, wherein the polymeric material comprises polyvinyl chloride, polypropylene, or polyethylene terephthalate.

15. The carpet tile of claim 1, wherein the secondary backing layer further comprises a plasticizer.

16. The carpet tile of claim 15, wherein the plasticizer is selected from the group consisting of di-iso-nonyl phthalate, tri-cresyl phosphate, triphenyl phosphate isopropylated, or a castor bean-based plasticizer.

17. The carpet tile of claim 16, wherein the plasticizer comprises triphenyl phosphate isopropylated.

18. The carpet tile of claim 1, wherein the carpet tile complies with one or more of the following standards for flame, smoke or toxicity: FAR 25.853; BSS 7239; BSS 7238; D6-51377 and BSS 7230.

19. The carpet tile of claim 1, wherein the carpet has a dimensional stability of plus or minus 0.2% or less as determined by ISO 2551.

20. The carpet tile of claim 1, wherein the flame retardant layer comprises a latex material.

21. The carpet tile of claim 1, wherein the filler is flame resistant.

22. The carpet tile of claim 15, wherein the plasticizer comprises a flame retardant.

23. The carpet tile of claim 15, wherein the plasticizer comprises a first plasticizer and a second plasticizer, wherein at least one of the first and second plasticizers comprises a flame retardant.

24. The carpet tile of claim 23, wherein the first plasticizer comprises ester phosphate.

25. A carpet tile comprising:
 a. yarns tufted into a tufting primary layer;
 b. a precoat layer below the tufting primary layer; and
 c. a secondary backing layer, wherein the secondary backing layer comprises:
  i. a polymeric material;
  ii. a first plasticizer and a second plasticizer, wherein at least one of the first and second plasticizers comprises a flame retardant; and
  iii. a filler,
wherein the carpet tile is a hardback carpet tile and has a weight of approximately 42 to 66 ounces per square yard.

26. The carpet tile of claim 25, wherein the yarns weigh approximately 16 ounces per square yard or less.

27. The carpet tile of claim 25, wherein the tufting primary layer comprises a flame retardant.

28. The carpet tile of claim 25, wherein the tufting primary layer comprises a nonwoven polyester.

29. The carpet tile of claim 25, wherein the secondary backing layer further comprises a smoke suppressant.

30. The carpet tile of claim 25, wherein the secondary backing layer further comprises a flame resistant reinforcing layer.

31. The carpet tile of claim 25, wherein the filler comprises hollow microspheres.

32. The carpet tile of claim 25, wherein the first plasticizer comprises ester phosphate.

33. The carpet tile of claim 25, wherein the carpet tile complies with one or more of the following standards for flame, smoke or toxicity: FAR 25.853; BSS 7239; BSS 7238; D6-51377 and BSS 7230.

34. A carpet tile comprising:
 a. yarns tufted into a tufting primary layer;
 b. a precoat layer below the tufting primary layer; and
 c. a secondary backing layer, wherein the secondary backing layer comprises:
  i. a polymeric material;
  ii. a first plasticizer and a second plasticizer, wherein the first plasticizer comprises ester phosphate and wherein at least one of the first and second plasticizers comprises a flame retardant; and
  iii. a filler comprising hollow microspheres,
wherein the carpet tile is a hardback carpet tile and has a weight of approximately 42 to 66 ounces per square yard.

35. The carpet tile of claim 34, wherein the tufting primary layer comprises a flame retardant.

36. The carpet tile of claim 34, wherein the carpet tile complies with one or more of the following standards for flame, smoke or toxicity: FAR 25.853; BSS 7239; BSS 7238; D6-51377 and BSS 7230.

* * * * *